United States Patent Office 3,157,643
Patented Nov. 17, 1964

3,157,643
PROCESS AND 5-OXYGENATED INTERMEDIATES FOR THE MANUFACTURE OF 19-NORSTEROIDS OF THE ANDROSTANE SERIES
Raphael Pappo, Skokie, and Leonard N. Nysted, Highland Park, Ill., assignors to G. D. Searle & Co., Chicago, Ill., a corporation of Delaware
No Drawing. Filed Oct. 28, 1963, Ser. No. 319,570
5 Claims. (Cl. 260—239.55)

The present invention is concerned with a novel process utilizing novel intermediates in the manufacture of 17α-alkynyl-17β-hydroxy-19-norandrost-4-en-3-ones, the latter compounds being represented by the structural formula

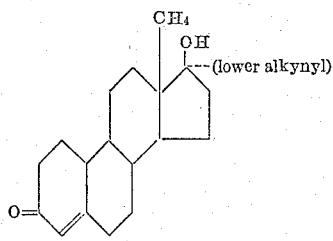

The aforementioned novel intermediates can be represented by the following structural formula

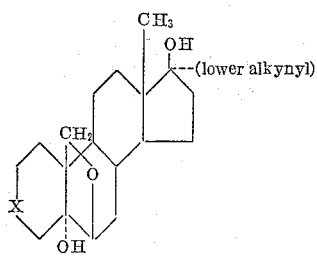

wherein X is either a carbonyl or β-hydroxymethylene radical.

Exemplary of the lower alkynyl radicals encompassed in the foregoing representation are ethynyl, propynyl, butynyl, pentynyl, hexynyl, and the branched-chain groups isomeric therewith.

This application is a continuation-in-part of our copending application Serial No. 288,881, filed June 19, 1963.

The instant process utilizes as the preferred starting material, 6β,19-epoxy-3β,5α-dihydroxyandrostan-17-one. As is described in the aforementioned application, of which this is a continuation-in-part, the latter starting material may be obtained by processes involving 3-(lower alkanoyl) esters of 5β,6β-epoxy-3β-hydroxyandrostan-17-one or the corresponding 17-ketals. Thus, those 5β,6β-epoxides are cleaved by reaction with a lower alkanoic acid in the presence of an acidic catalyst to produce the corresponding 5α-(lower alkanoyl)oxy-6β-hydroxy compounds, which are allowed to react with a suitable reagent such as lead tetraacetate, lead tetraacetate and iodine, mercuric acetate and iodine, or silver acetate and iodine, resulting in the 6β,19-epoxy derivatives. As a specific example, 3β-acetoxy-5β,6β-epoxyandrostan-17-one is contacted with acetic acid in the presence of p-toluenesulfonic acid at room temperature, and the resulting 3β,5α-diacetoxy-6β-hydroxyandrostan-17-one in carbon tetrachloride solution is heated with lead tetraacetate and iodine to afford 3β,5α-diacetoxy-6β,19-epoxyandrostan-17-one. Hydrolysis with potassium carbonate in aqueous methanol yields the desired 6β,19-epoxy-3β,5α-dihydroxyandrostan-17-one. When the 17-ketal starting materials are used, that protecting group is removed by reaction with p-toluenesulfonic acid in a suitable organic solvent medium such as acetone.

The novel process of the present invention involves as the first step reaction of 6β,19-epoxy-3β,5α-dihydroxyandrostan-17-one, obtained as described above, with a lower alkyne or with an appropriate organometallic alkynyl reagent. Examples of suitable reagents are the lithium alkynylides and alkynyl magnesium halides, typically the bromides. When the alkyne itself is used, the process is preferably conducted in the presence of an alkaline catalyst. Specifically illustrative of this alkynylation process is the reaction of the aforementioned starting material with acetylene in the presence of potassium tertiary-pentoxide to afford 6β,19-epoxy-17α-ethynylandrostane-3β,5α,17β-triol. Oxidation of that triol, typically with chromic acid in acetone yields 6β,19-epoxy-17α-ethynyl-5α,17β-dihydroxyandrostan-17-one, and reaction of the latter substance with zinc dust and acetic anhydride results in cleavage of the epoxy linkage to afford 17α-ethynylandrosta-3,5-diene-3,17β,19-triol 3,17,19-triacetate. That enol ester is hydrolyzed, for example with p-toluenesulfonic acid in methanol, to afford 17α-ethynyl-17β,19-diacetoxyandrost-4-en-3-one. Removal of the acetate groups can be effected by saponification with potassium hydroxide in aqueous methanol, optionally containing 5,5-dimethylcyclohexanedione-1,3, thus affording 17α-ethynyl-17β-hydroxy-19-norandrost-4-en-3-one.

As is disclosed in our aforementioned copending application Serial No. 288,881, the preferred starting material for the instant process, 6β,19-epoxy-3β,5α-dihydroxyandrostan-17-one, can alternatively be obtained by a procedure involving conversion of the 3-(lower alkanoyl) esters of 5β,6β-epoxy-3β-hydroxyandrostan-17-one to the corresponding 5α-(lower alkoxy) derivatives. Typically, 3β-acetoxy-5β,6β-epoxyandrostan-17-one is contacted with methanol and p-toluenesulfonic acid to afford 3β-acetoxy-6β-hydroxy-5α-methoxyandrostan-17-one, and the latter substance is converted to the desired 17α-(lower alkynyl)-17β-hydroxy-19-norandrost-4-en-3-ones by procedures analogous to those described above involving the related 5α-(lower alkanoyl)oxy compounds.

The 17α-(lower alkynyl)-17β-hydroxy-19-norandrost-4-en-3-ones produced by the present process utilizing the instantly disclosed novel intermediates are valuable as a result of their pharmacological activity. 17α-ethynyl-17β-hydroxy-19-norandrost-4-en-3-one, for example, is a well-known progestational agent.

The invention will appear more fully from the examples which follow. These examples are set forth by way of illustration only, and it will be understood that the invention is not to be construed as limited either in spirit or in scope by the details contained therein as many modifications in materials and methods will be apparent from this disclosure to those skilled in the art. In these examples, temperatures are given in degrees centigrade (° C.). Quantities of materials are expressed in parts by weight except where otherwise noted.

Example 1

A mixture of 26 parts of 3β,5α-diacetoxy-6β-hydroxyandrostan-17-one, 59.2 parts of lead tetraacetate, 25.6 parts of iodine, and 1600 parts of carbon tetrachloride is stirred and heated at the reflux temperature for about 8 hours. The reaction mixture is cooled, and the insoluble material is removed by filtration. The filtrate is washed with aqueous sodium thiosulfate, then is dried over anhydrous sodium sulfate and concentrated to an oil at reduced pressure. This oil is crystallized from a mixture of methylene chloride and hexane to yield 3β,5α-diacetoxy-6β,19-epoxyandrostan-17-one, melting at about 112–114°.

Example 2

A mixture of 18 parts of 3β-acetoxy-5β,6β-epoxyandrostan-17-one, 37.8 parts of acetic acid, and 0.18 part of p-toluenesulfonic acid is stirred at room temperature for about 21 hours, then is diluted with water. The resulting solid which separates is collected by filtration, washed with water, and dried. Recrystallization of this material from a mixture of acetone and hexane produces pure 3β,5α-diacetoxy-6β-hydroxyandrostan-17-one, which substance melts at about 226–229°.

Example 3

A mixture of 2 parts of 3β,5α-diacetoxy-6β,19-epoxyandrostan-17-one, 5 parts of potassium carbonate, 64 parts of methanol, and 20 parts of water is stirred at room temperature for about 60 hours. The organic solvent is removed by distillation at reduced pressure, and approximately 30 parts of water is added. The resulting solid is collected by filtration, washed on the filter with water, and dried to yield 6β,19-epoxy-3β,5α-dihydroxyandrostan-17-one, melting at about 270–272°.

Example 4

To 101 parts of tertiary-amyl alcohol is added, in a nitrogen atomsphere at the reflux temperature, 10 parts of potassium, and refluxing is continued until solution is complete. This solution is cooled to about 5°, and the resulting suspension of potassium tertiary-pentoxide is diluted with an equal volume of ether. Acetylene gas is passed into the mixture for about 30 minutes, after which time 10 parts of 6β,19-epoxy-3β,5α-dihydroxyandrostan-17-one is added. The addition of acetylene is continued for about 3 hours longer, and this reaction mixture is then stored at 0–5° for about 16 hours. To that mixture is added approximately 100 parts of 10% aqueous ammonium chloride, and the tertiary-amyl alcohol is removed by steam-distillation. The solid which separates is collected by filtration, washed with water, and dried. Recrystallization from methanol-ethyl acetate produces pure 6β,19-epoxy-17α-ethynylandrostane-3β,5α,17β-triol, melting at about 285–287°. It is represented by the structural formula

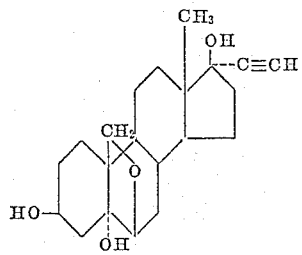

Example 5

To a solution of 3 parts of 6β,19-epoxy-17α-ethynylandrostane-3β,5α,17β-triol in 160 parts of acetone is added approximately 3 parts by volume of an aqueous solution, 8 N in chromium trioxide and 8 N in sulfuric acid, until an excess of the oxidant is present. Approximately 2.4 parts of isopropyl alcohol is then added to destroy the excess oxidizing agent, and the solvents are removed by distillation at reduced pressure. The resulting mixture is diluted with water, and the solid material is collected by filtration, then washed and dried. Recrystallization from a mixture of tetrahydrofuran and ethyl acetate results in pure 6β,19-epoxy-17α-ethynyl-5α,17β-dihydroxyandrostan-3-one, melting at about 295–300° and represented by the structural formula

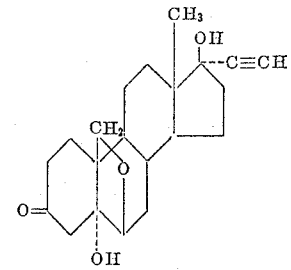

Example 6

A mixture of 1.08 parts of 6β,19-epoxy-17α-ethynyl-5α,17β-dihydroxyandrostan-3-one, 10 parts of zinc dust, and 54 parts of acetic anhydride is heated at the reflux temperature in an atmosphere of nitrogen for about 3 hours. This reaction mixture is then cooled, filtered, and concentrated to dryness under reduced pressure to yield 17α-ethynylandrosta-3,5-diene-3,17β,19-triol 3,17,19-triacetate.

To a solution of 5.4 parts of 17α-ethynylandrosta-3,5-diene-3,17β,19-triol 3,17,19-triacetate in 80 parts of methanol is added 5 parts of p-toluenesulfonic acid, and the resulting mixture is kept at room temperature for about 16 hours. Removal of the solvent by distillation at reduced pressure affords a residue which is extracted with benzene. The benzene solution is washed successively with aqueous sodium bicarbonate and water, then is concentrated to dryness at reduced pressure to afford 17α-ethynyl-17β,19-diacetoxyandrost-4-en-3-one.

Example 7

To a solution of 1.17 parts of 17α-ethynylandrosta-3,5-diene-3,17β,19-triol 3,17,19-triacetate in 100 parts of ethanol is added a solution of 2 parts of 5,5-dimethylcyclohexanedione-1,3 in 100 parts by volume of 3.4 N aqueous potassium hydroxide. This reaction mixture is stored at room temperature for about 6 hours, then is diluted with water and extracted with benzene. The organic solution is washed successively with 10% aqueous potassium hydroxide and water, dried over anhydrous sodium sulfate, and concentrated to dryness, resulting in 17α-ethynyl-17β-hydroxy-19-norandrost-4-en-one.

Example 8

A mixture of 10.9 parts of 17α-ethynyl-17β,19-diacetoxyandrost-4-en-3-one, 500 parts by volume of 3.4 N potassium hydroxide, and 80 parts of ethanol is stored at room temperature for about 3 hours, then is concentrated to dryness at reduced pressure. The resulting residue is extracted with benzene, and the benzene solution is washed successively with dilute hydrochloric acid and water. Drying over anhydrous sodium sulfate followed by distillation of the solvent at reduced pressure yields 17α-ethynyl-17β-hydroxy-19-norandrost-4-en-3-one, identical with the product of Example 7.

Example 9

To a mixture of 0.08 part of p-toluenesulfonic acid in 16 parts of methanol is added 10 parts of 3β-acetoxy-5β,6β-epoxyandrostan-17-one, and this reaction mixture is stirred at room temperature for about 15 minutes. At the end of this time, an additional 0.08 part of p-toluenesulfonic acid and approximately 3 parts of methanol are added, and stirring is continued for about 15 minutes longer in order to achieve complete solution. The reaction mixture is diluted with water and extracted with ethyl acetate. The ethyl acetate layer is separated, washed with dilute aqueous potassium bicarbonate, dried over anhydrous sodium sulfate, and concentrated to dryness under reduced pressure to afford a crystalline residue. Recrystallization from a mixture of methylene chloride, hexane, and ether yields pure 3β-acetoxy-6β-hydroxy-5α-methoxyandrostan-17-one, melting at about 201–203°.

What is claimed is:

1. A process for the manufacture of 17α-ethynyl-17β-hydroxy-19-norandrost-4-en-3-one which comprises the steps of contacting 6β,19-epoxy-3β,5α-dihydroxyandrostan-17-one with acetylene, oxidizing the resulting 6β,19-epoxy-17α-ethynylandrostane-3β,5α,17β-triol with chromium trioxide to afford 6β,19-epoxy-17α-ethynyl-5α,17β-dihydroxyandrostan-3-one, contacting the latter substance with zinc and acetic anhydride to yield 17α-ethynyl-androsta-3,5-diene-3,17β,19-triol 3,17,19-triacetate, hydrolyzing that triester with p-toluenesulfonic acid to produce 17α-ethynyl-17β,19-diacetoxyandrost-4-en-3-one, and contacting the latter compound with an alkali metal hydroxide, resulting in 17α-ethynyl-17β-hydroxy-19-norandrost-4-en-3-one.

2. A process for the manufacture of 17α-ethynyl-17β-hydroxy-19-norandrost-4-en-3-one which comprises the steps of contacting 6β,19-epoxy-3β,5α-dihydroxyandrostan-17-one with acetylene, oxidizing the resulting 6β,19-epoxy-17α-ethynylandrostane-3β,5α,17β-triol with chromium trioxide to afford 6β,19-epoxy-17α-ethynyl-5α,17β-dihydroxyandrostan-3-one, contacting the latter substance with zinc and acetic anhydride to yield 17α-ethynyl-androsta-3,5-diene-3,17β,19-triol 3,17,19-triacetate, and contacting that triester with an alkali metal hydroxide in the presence of 5,5-dimethylcyclohexanedione-1,3 to yield 17α-ethynyl-17β-hydroxy-19-norandrost-4-en-3-one.

3. A compound of the formula

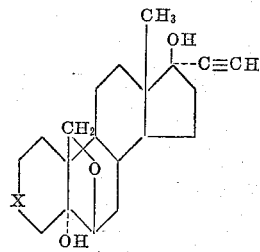

wherein X is selected from the group of radicals consisting of carbonyl and β-hydroxymethylene.

4. 6β,19-epoxy-17α-ethynylandrostane-3β,5α,17β-triol.

5. 6β,19-epoxy-17α-ethynyl-5α,17β-dihydroxyandrostan-3-one.

References Cited in the file of this patent

UNITED STATES PATENTS 3,001,989    Ringold et al. _____ Sept. 26, 1961

OTHER REFERENCES

Berkoz et al.: "Steroids," vol. 1, No. 3, March 1963, pp. 251–370.